Figure 1:
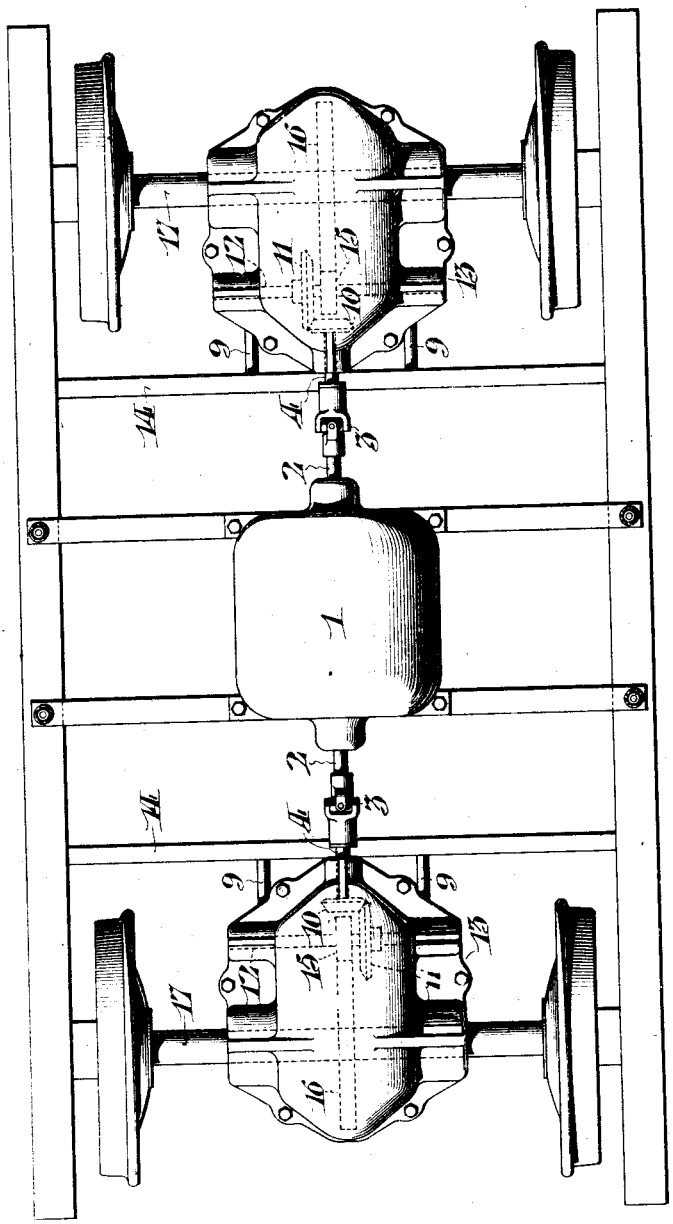

W. J. SPANGLER.
DRIVING GEAR FOR ELECTRICALLY ACTUATED TRUCKS OR RAIL CARS.
APPLICATION FILED FEB. 21, 1911.

1,031,882.

Patented July 9, 1912.
2 SHEETS—SHEET 1.

Witnesses
John C. Bergner
James B. Bell

Inventor
Walter J. Spangler,
by Henry & Paul
Attorney

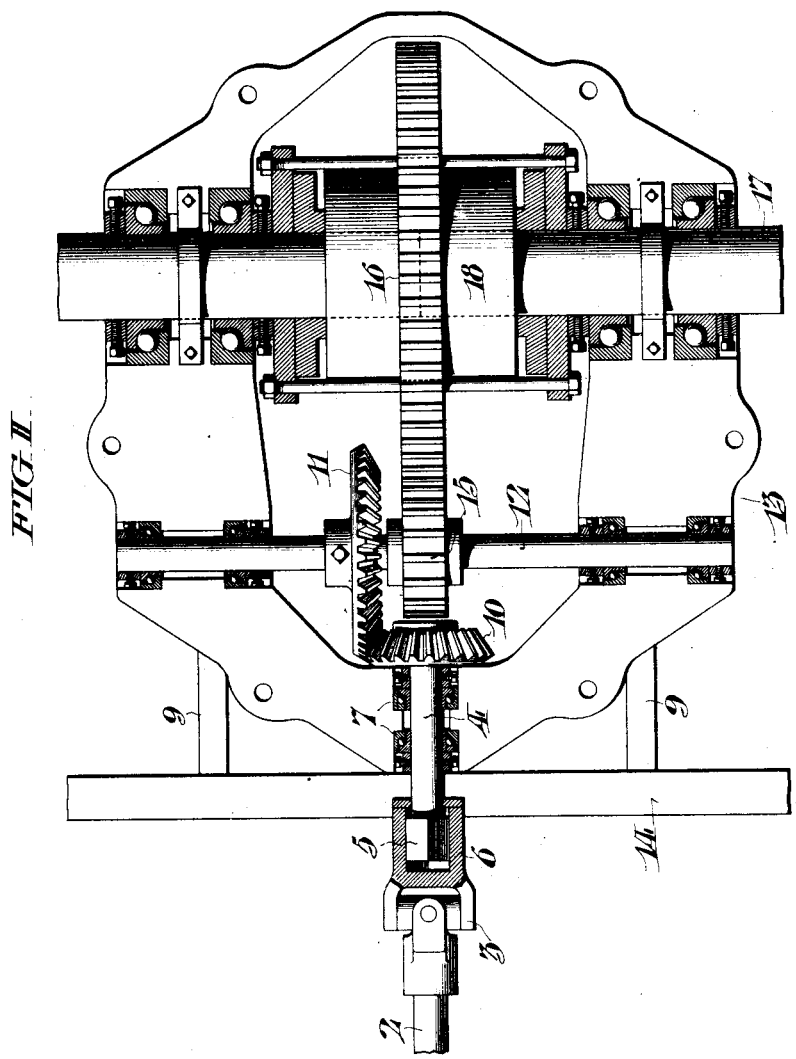

UNITED STATES PATENT OFFICE.

WALTER J. SPANGLER, OF PHILADELPHIA, PENNSYLVANIA, ASSIGNOR OF ONE-HALF TO RUSSELL THAYER, OF PHILADELPHIA, PENNSYLVANIA, AND ONE-FOURTH TO RICHARD M. ELLIOT, OF BRYN MAWR, PENNSYLVANIA.

DRIVING-GEAR FOR ELECTRICALLY-ACTUATED TRUCKS OR RAIL-CARS.

1,031,882.      Specification of Letters Patent.      Patented July 9, 1912.

Application filed February 21, 1911. Serial No. 610,079.

*To all whom it may concern:*

Be it known that I, WALTER J. SPANGLER, of Philadelphia, in the county of Philadelphia and State of Pennsylvania, have invented certain new and useful Improvements in Driving-Gear for Electrically-Actuated Trucks or Rail-Cars, whereof the following is a specification, reference being had to the accompanying drawings.

My invention is especially designed for electrical cars and consists of an axial driving gear by means of which the motion of the motor shaft is transmitted to the axles of the truck in the median plane of a truck (or of a rail car), with avoidance of the lateral strain or torque to which the truck (or frame) of a car is subjected by driving gear by which power is communicated to the axles elsewhere than in the median plane.

According to my invention, I mount upon the truck or frame, of the car, a motor with its shaft lying longitudinally in the median plane thereof, the motor occupying a central position. This shaft drives at both ends, a bevel gear mounted on the same axis, which gears with a bevel pinion mounted on a countershaft carrying a pinion lying in the median plane of the truck which gears with the driving gear of the axle, lying in the same plane.

In the accompanying drawings, Figure I, is a plan view showing a truck provided with a driving gear embodying my invention. Fig. II, is a horizontal section through the parts of the gear adjacent to one of the axles.

Referring to the drawings, the motor 1, is slung centrally upon the truck, with its motor shaft 2, lying longitudinally in the median plane of the truck. Both ends of the motor shaft are projected and employed for driving respectively the two axles of the truck.

The driving gear for the connections is the same for both axles and a description of one will therefore suffice as a description of both. A universal joint 3, of standard construction is interposed in the shaft 2. The extension 4, of this shaft beyond the universal joint, is provided with a square head 5, fitting in a squared socket 6, formed in the universal joint, thereby allowing for alteration in the effective length of the motor shaft. The extension 4, rests in suitable ball bearings 7, and carries at its extremities a bevel pinion 10, which meshes with a bevel gear 11, set upon a countershaft 12. This countershaft is mounted in suitable bearings in a box or housing 13, slung upon the truck, and carried preferably partly by the wheel axle, with which it is associated, and partly by a cross bar 14, running between the sides of the truck, to which it is bound by bars or webs 9.

In the median plane of the truck, the countershaft 12, carries the pinion 15, which meshes with the gear 16, which surrounds the axle 17, also in the median plane of the truck. This gear 16, may be set directly upon the axle, but I prefer to interpose a differential gear as indicated at 18. By the use of this gearing, lateral strain upon the axles of the car is effectively avoided.

I claim:—

1. A driving gear for a rail car comprising an electric motor and motor shaft mounted centrally between the axles and longitudinally to the car; a bevel gear carried by the motor shaft; a bevel pinion meshing therewith and mounted on a countershaft; a pinion mounted on said countershaft; and a gear engaging said pinion mounted on an axle of the rail car, the latter pinion and gear being in the median plane of the car.

2. In an electric rail car a truck carrying a motor with its motor shaft lying in the median plane thereof, and provided with a bevel gear at each extremity; countershafts with bevel gear meshing with each of such bevel gear, each countershaft being geared to an axle by gearing lying in the median plane of the truck.

In testimony whereof, I have hereunto signed my name at Philadelphia, Pennsylvania, this tenth day of February 1911.

WALTER J. SPANGLER.

Witnesses:
    JAMES H. BELL,
    E. L. FULLERTON.